United States Patent [19]

Yamamoto

[11] Patent Number: 5,219,452
[45] Date of Patent: Jun. 15, 1993

[54] SCREW OR NAIL SUSTAINER FOR MOUNTING OBJECTS TO A DRILLED HOLE IN A WALL

[76] Inventor: Akio Yamamoto, 1602-banchi, Kyoden 1-chome, Fukui-shi, Fukui-ken, Japan

[21] Appl. No.: 928,378

[22] Filed: Aug. 12, 1992

[30] Foreign Application Priority Data

Aug. 14, 1991 [JP] Japan .................................. 3-72390

[51] Int. Cl.⁵ ........................ F16B 13/06; F16B 39/02
[52] U.S. Cl. ......................................... 411/82; 411/61; 411/258; 411/930
[58] Field of Search ............... 411/42, 55, 60, 61, 411/82, 258, 508–510, 930; 52/704, 707

[56] References Cited

U.S. PATENT DOCUMENTS

| | | | |
|---|---|---|---|
| 3,308,585 | 3/1967 | Fischer | 52/704 |
| 3,706,139 | 12/1972 | Brumlik | 411/61 |
| 4,063,582 | 12/1977 | Fischer | 52/704 |
| 4,836,729 | 6/1989 | Bisping et al. | 411/82 |
| 4,893,974 | 1/1990 | Fischer et al. | 411/82 |

Primary Examiner—Neill R. Wilson
Attorney, Agent, or Firm—Edwin E. Greigg; Ronald E. Greigg

[57] ABSTRACT

A screw or nail sustainer comprising a tube having a chamber for inserting a screw or nail into a base opening of the chamber, at least one fluid flow opening formed with a base portion of the tube for injecting a liquid resin, and at least one ring-like projection formed with a portion of the tube remote from the fluid flow opening toward a tip of the tube to project from and to surround a periphery of the tube. A plurality of bag forming wings are provided with the tip portion of the tube to project radially. The bag forming wings are bent toward the base portion of the tube when the screw or nail sustainer is inserted into a hole of a board so that a bag like portion may be made in cooperation with the outer surface of the tube so as to make an opening toward the base portion of the tube.

5 Claims, 12 Drawing Sheets

SCREW OR NAIL SUSTAINER FOR MOUNTING OBJECTS TO A DRILLED HOLE IN A WALL

Background of the Invention (1). Field of the Invention

The present invention relates to a screw or nail sustainer which may increase a sustaining force against a board such as a plaster board or a plywood by strengthening a poor screw or nail sustaining force thereof.

(2). Description of the Prior Art

When hanging a relatively heavy article such as a blackboard or a picture frame by means of a screw or nail which is driven or hit into a wall of plaster board or plywood, it is usually experienced that the screw or nail becomes loosened and cannot support the article since such a wall is very poor in sustaining a screw or nail.

By the way, the plaster board or plywood does not have a fine structure therein and therefore when the structure of the board is once broken due to application of the screw or nail, it is easy to accelerate a break in the board about a hole of the board for the screw or nail when a heavy load acts on the screwed nail.

In view of the above-mentioned problems, the inventor researched and arrived at the steps of inserting a liquid resin into the periphery of a hole which was formed by driving or hitting the screw or nail and hardening the periphery of the hole so as to prevent a break in the hole and support the screw or nail firmly.

The inventor progressed and improved the above-mentioned technique practically and then proposed a screw or nail sustainer for increasing a nail sustaining force in Japanese Utility Model Laid-Open Publication No. 2-122206.

Figure 11:
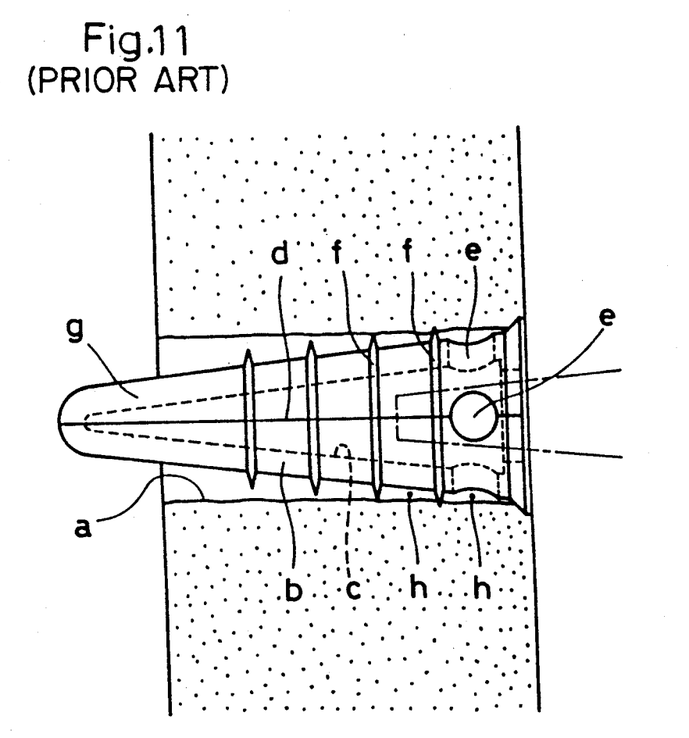
FIG. 11 is a side view showing a conventional screw or nail sustainer inserted into a hole formed with a board.

The proposed screw or nail sustainer g provided a tube b for insertion of a screw or nail into a hole a of a board, as shown in FIG. 11. The tube b was provided with splitting lines d along the entire length of a chamber c of the tube b. Flowing openings e for injecting a liquid resin, were formed with at least a base portion of the tube b. Further, ring-like projections f were formed with portions of the tube remote from the flowing openings toward a tip of the tube so as to surround a periphery of the tube, and as a result, the following functions and advantages could be obtained.

Figure 12:
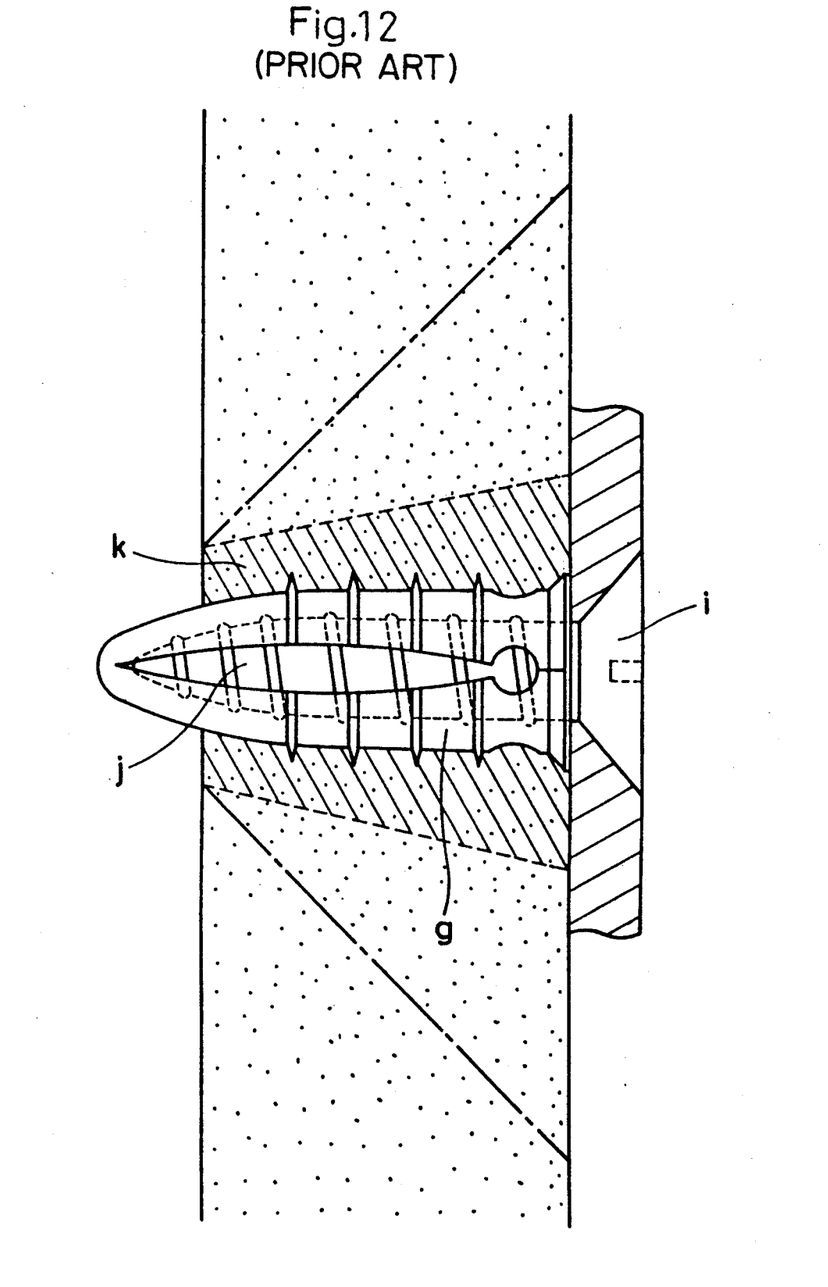
FIG. 12 is a sectional view showing the function of the conventional screw or nail sustainer.
Figure 13:
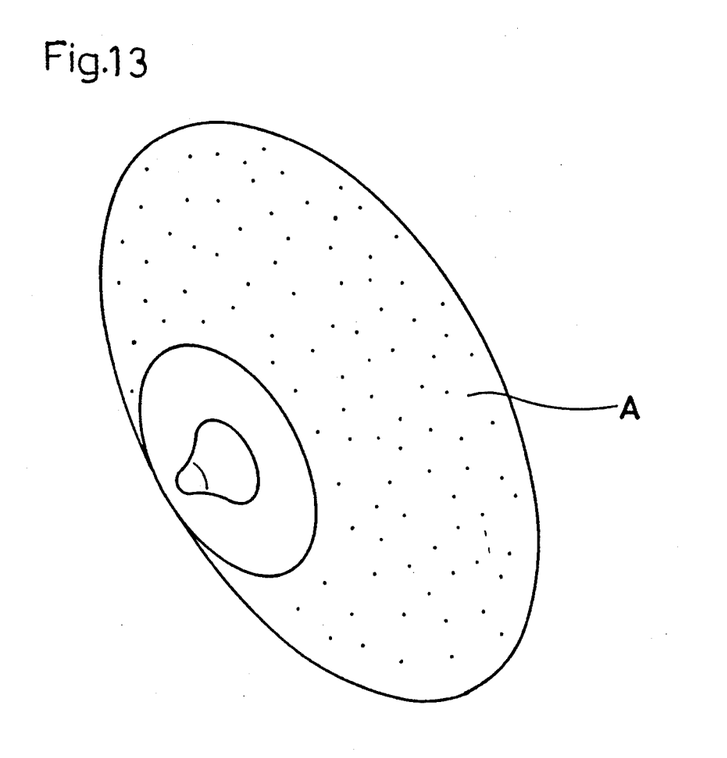
FIG. 13 is a perspective view showing a portion of a board which is broken in using the screw or nail sustainer of the present invention.

When the screw or nail sustainer g was inserted into the hole a formed with the board which was poor in sustaining a nail, the flowing openings e for the liquid resin were positioned to face the inner periphery of the hole a and spaces h forming a ring to surround the base peripheral portion of the tube b (See FIG. 11). Therefore, the liquid resin supplied into the chamber c flowed through the flowing openings e so that the liquid resin could be introduced effectively by the ring-like spaces h in a direction of the periphery and permeated into the inner peripheral portion of the hole a. With hardening of the liquid resin thereafter, the peripheral portion k of the hole a became a fine structure, as shown with hatching in FIG. 12, so that the nail sustainer g became integral with the fine structure. Thus, since the screw or nail sustainer became integral with the fine structure of the board, the board could obtain a great resistance against a force in a direction of withdrawl of the screw or nail fixed to the screw or nail sustainer.

According to the above-mentioned screw or nail sustainer, it became possible to stably support a relatively heavy article such as a picture frame or a blackboard by, for example, a plaster board having a poor sustaining force.

As mentioned above, the screw or nail sustainer proposed by the inventor presented a superior screw or nail sustaining force and therefore obtained advantages of stably supporting a picture frame, a blackboard or a hanging shelf by a plaster board or a plywood used as a wall, but the following problems arose through a number of actual uses.

Namely, when using the above-mentioned screw or nail sustainer by inserting a screwed nail thereinto and fixing the same to a wall of plaster and repeating hanging a heavy article on the screw or nail or taking off the same, it sometimes happened that the screw or nail sustainer fell off the wall together with a part of the wall of plaster.

Then, the inventor has analyzed such a phenomenon and arrived at had the following conclusions.

Figure 14:
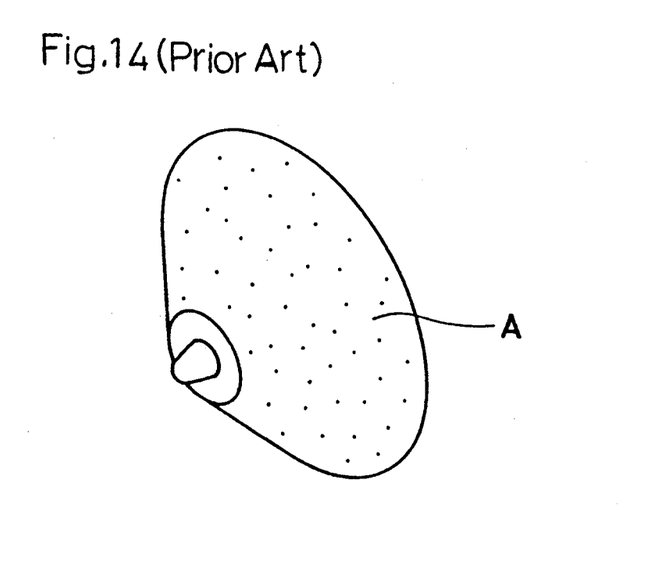
FIG. 14 is a perspective view showing a portion of a board which is broken in using the screw or nail sustainer of the prior art.

Namely, when examining the state of falling off of the screw or nail sustainer from the board, it has been found that the screw or nail sustainer carries a little amount of plaster with the tip thereof and a great amount of plaster is adhered to the base portion thereof. The shape of the plaster forms substantially a truncated cone, as shown in FIG. 14.

First, a cylindrical hole is drilled within the wall of plaster. It is found that the liquid resin permeates the periphery of the hole via the screw or nail sustainer deeply around the base portion of the hole and shallowly around the forward or deep portion of the hole, and that permeation can be made substantially even along the entire length of the hole. In other words, the screw or nail sustainer is held by the wall of plaster with substantially an even sustaining force from the tip to the base portion thereof. Therefore, when a strong drawing force acts on the screw or nail sustainer downwardly via the screw or nail, the wall of fragile plaster is broken greatly with the surface of the wall and slightly with the deep portion thereof so as to form a truncated cone and then the screw or nail sustainer falls off together with the broken part of the wall of plaster.

SUMMARY OF THE INVENTION

This invention has an object to present a screw or nail sustainer which may not easily fall off even if a great load acts on a screw or nail by improving the above-mentioned screwed nail sustainer on the basis of the above-mentioned conclusions.

To achieve the object, the screwed nail sustainer comprises a tube having a chamber for inserting a screwed nail into a base opening of the chamber, at least one flowing opening is formed with a base portion of the tube for injecting a liquid resin, and at least one ring-like projection formed with a portion of the tube remote from the flowing opening toward a tip of the tube to surround a periphery of the tube, said screw or nail sustainer comprises a plurality of bag forming wings provided with the tip portion of the tube to project radially, said bag forming wings being constructed to bend toward the base portion of the tube when they are inserted into a hole of a board and to form a bag like portion in cooperation with the outer surface of the tube so as to make an opening toward the base portion of the tube. It should be noted that in this invention the screw or nail sustainer may be applied for a normal nail which is not provided with a screw as well as with a screw having threads.

The second object of this invention is to obtain an advantage in manufacturing the screw or nail sustainer by separating a tube of the screw or nail sustainer into two pieces so as to be fit together. The two pieces are screwed together at the tip of the sustainer so that when the two pieces are folded together they form one sustainer.

To achieve the second object, the present invention is characterized in that said tube comprises a pair of divided half portions which are bendably connected to each other with their tips thereof, and that the flowing opening is at least one in the state of fitting of the divided half portions, and that the ring-like projections are formed to be semi-ring like flanges corresponding to the divided half portions, and that the bag forming wings are at least three for each of the divided half portions.

Therefore, the present invention has the following advantages. (A) When the screw or nail sustainer is inserted into a hole formed within a board such as a plaster board or a plywood which has a poor sustaining force for a screw or nail, the flowing opening for the liquid resin faces the inner wall of the hole and a ring like space is formed to surround the base portion of the tube and further the bag like portion is formed at a forward or deep end of the hole.

Accordingly, when a supply of the liquid resin is injected into the chamber of the tube and the screw or nail is driven into the chamber, the liquid resin flowing through the flowing opening can be introduced along the periphery in the ring like space so that the liquid resin may permeate the inner wall of the hole effectively. At the time, the bag like portion functions to prevent the liquid resin from flowing out in case that the hole penetrates the board, and as the result the liquid resin may deeply permeate the inner wall of the hole in the radial direction of the hole at the forward or deep end of the hole.

After hardening of the liquid resin, the inner wall of the hole becomes a fine structure so as to integrate the inner wall of fine structure with the screw or nail sustainer. At the same time, hardening of the liquid resin in the bag like portion may form a projection at the forward or deep end of the hole.

Therefore, the screw or nail sustainer cannot be easily withdrawn from the inner wall of fine structure due to anchor functions of the projection of the bag like portion since the projection is engaged with the inner wall of fine structure widely and deeply. Further, the widened and deep fine structure of the forward and deep end of the hole itself functions as an anchor against non-fine structure portions of the board, so that a great resistance for the screw or nail sustainer can be obtained against the direction of withdrawl of the screw or nail. In other words, if the board is broken due to a heavy load acting on the screw or nail which is fixed to the screw or nail sustainer, the board could be broken at the portions between the hardened fine structure around the screw or nail sustainer and the remaining non-fine structure. Since the fine structure of the board in the case of the present invention is widened deeply, such a break of the board occurs at the portions remote away from the screw or nail sustainer. This means that the screw or nail sustainer of the present invention increases a nail or screw sustaining force in comparison with that of the prior art. (B) Since the screw or nail sustainer provides the flexible bag forming wings with the outer surface of the tip of the tube, the bag like portion may be automatically formed by inserting the screw or nail sustainer into the hole of the board. As the result, the bag like portion becomes a projection when the liquid resin flowing into the bag like portion is hardened. Thus, the projection of the present invention may be easily obtained with the flexible bag forming wings in a simple construction.

Other objects and advantages of the present invention will be apparent from the following description of the embodiment with reference to the drawings.

BRIEF DESCRIPTION OF THE DRAWINGS

The drawings show an embodiment of a screw or nail sustainer according to the present invention in which.

DETAILED DESCRIPTION OF THE PREFERRED EMBODIMENT

Figure 1:
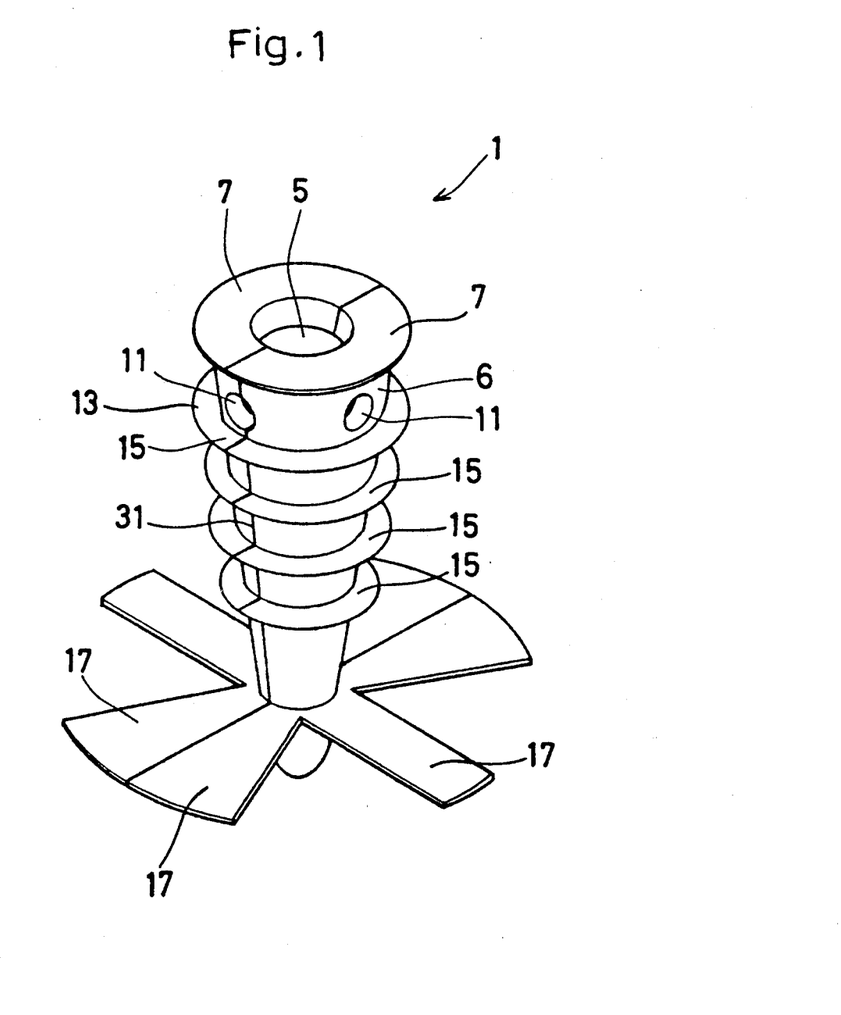
FIG. 1 is a perspective view of an example of the screw or nail sustainer.
Figure 2:
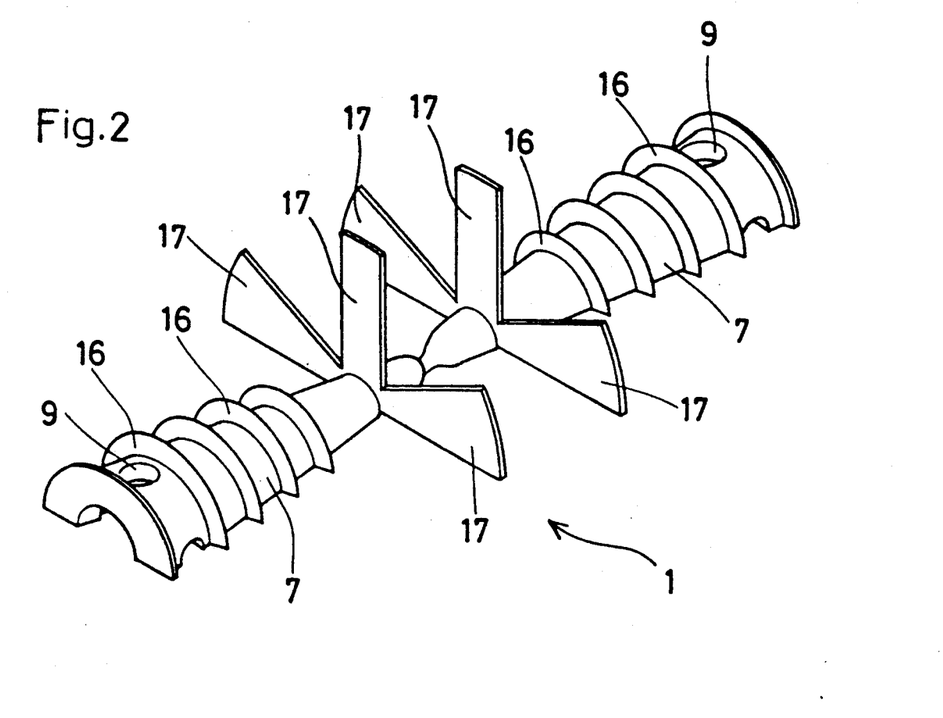
FIG. 2 is a perspective view showing the state in which a pair of divided half portions comprising the screw or nail sustainer are connected bendably to each other at the tips thereof.
Figure 3:
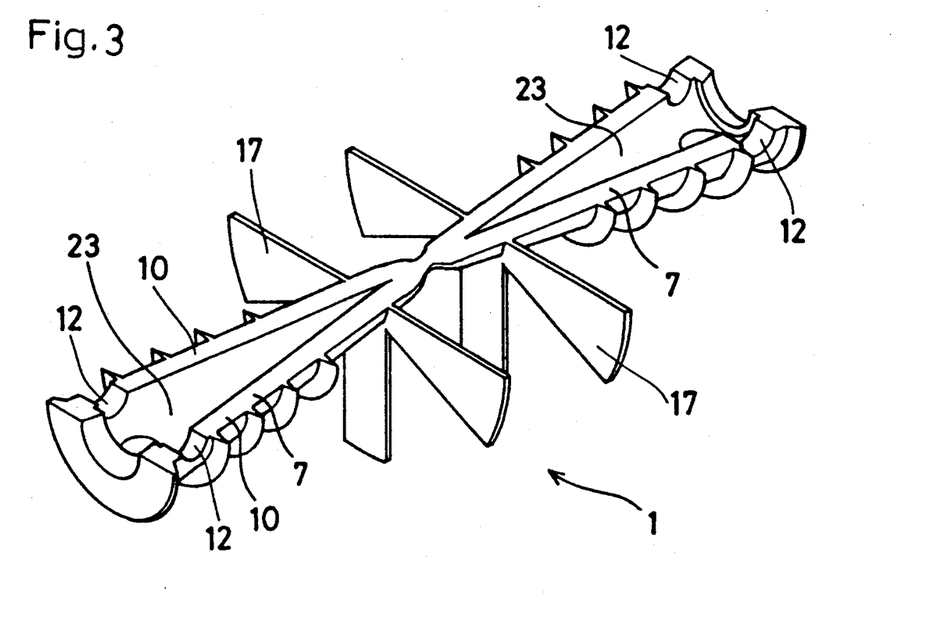
FIG. 3 is a perspective view showing the state in another direction in which a pair of divided half portions comprising the screw or nail sustainer are connected bendably to each other at the tips thereof.
Figure 4:
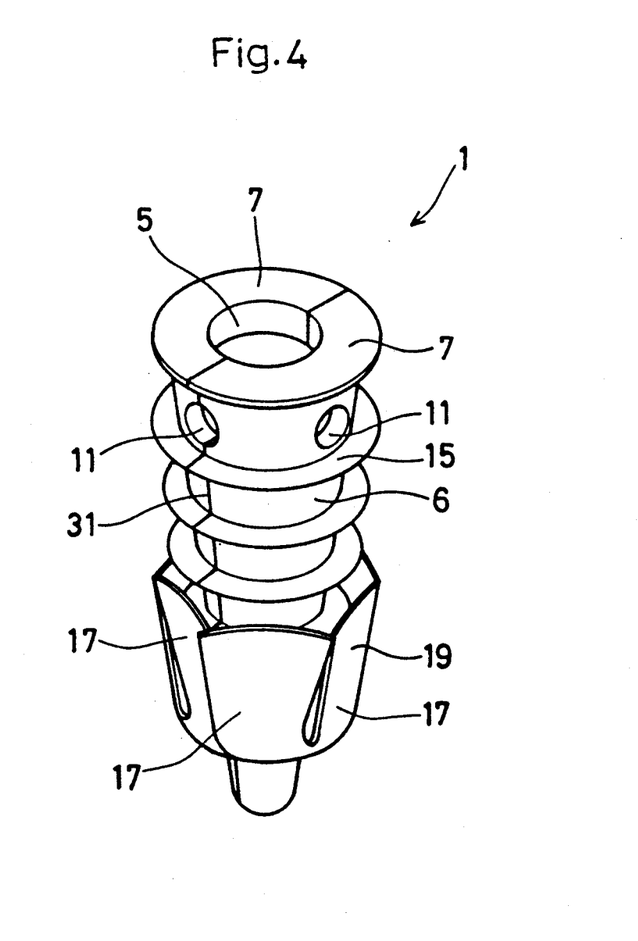
FIG. 4 is a perspective view showing a bag like portion formed by bag forming wings in such a manner that the bag forming wings are bent and squeezed at the tip portions thereof.
Figure 5:
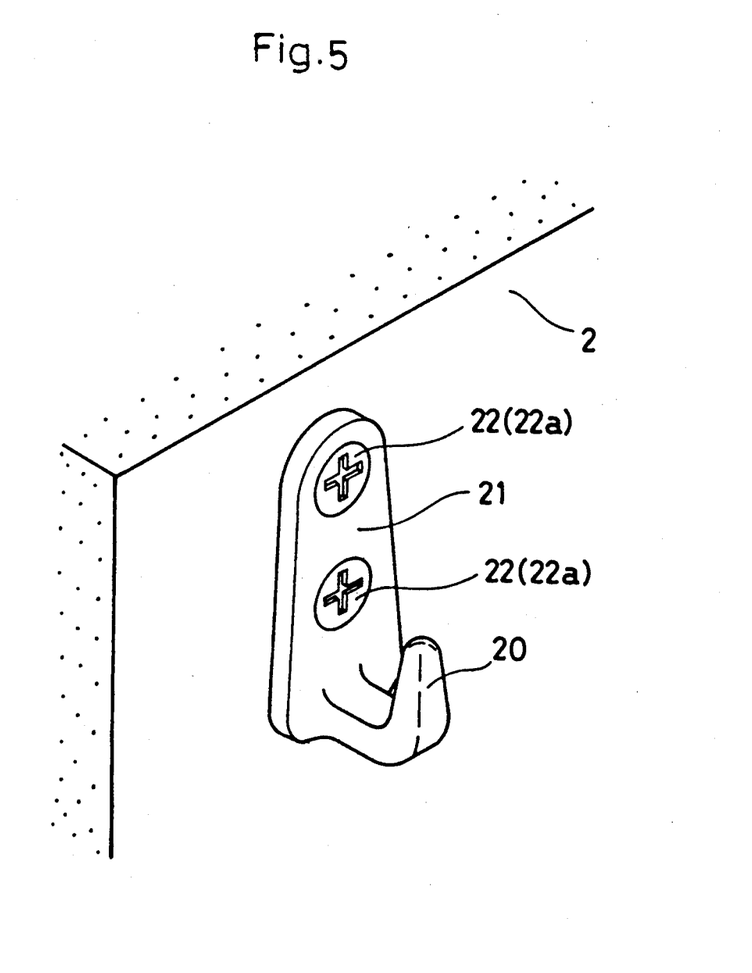
FIG. 5 is a perspective view showing a plate having a hook fixed to a plaster board by means of a screw.
Figure 6:
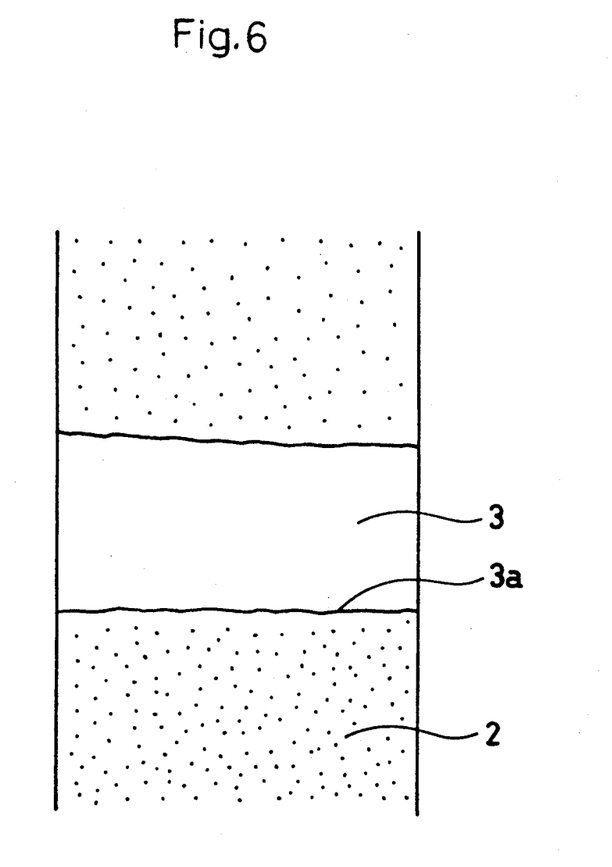
FIG. 6 is a sectional view showing a hole formed within the board.

As will be seen from FIGS. 1 through 4, a screw or nail sustainer 1 according to the present invention is made of plastics such as polyethylene. The screw or nail sustainer 1 is inserted and fixed in a hole 3 which is formed within a board such as a plaster board or a plywood which has a poor holding force against a screw or nail such as a wood screw, as shown in FIG. 6. The screw or nail sustainer 1 provides a pair of divided half portions 7 and 7, which are bendably connected to each other with their tips so as to form a tube 6, when they are bent and fit to each other. The tube 6 provides a chamber 5 therein and the chamber 5 is opened with the base end of the tube 6 so that the screw or nail may be inserted into the chamber 5 of the tube 6 through its opening 5. In other words, the tube 6 is divided into the two pieces of the divided half portions 7 and 7 along substantially the entire length of the tube 6 at substantially the same divisional angle (180 degrees to 180 degrees).

The divided half portions 7 and 7 are constructed identical to each other and formed to have a cross section of semicircle. A flow opening 11 is formed with a central portion beside the base end of each of the divided half portions 7 and 7, so as to permit a flow a liquid resin such as a hardening liquid resin therethrough. Further, a cut portion 12 is formed respectively with the side edges 10 and 10 beside the divided half portion 7, so that the cut portions 12 of the divided half portions 7 and 7 respectively form a flow opening 11 for the hardening liquid resin when the divided half portions 7 and 7 are bent and faced to each other.

A plurality of semi-ring like flanges 16 are formed to project from an outer surface portion of each of the divided half portions 7 and 7, leaving a suitable distance therebetween in a longitudinal direction of the divided half portions 7 and 7. When the divided half portions 7 and 7 are bent and fit to each other, the semi-ring like flanges 16 form ring-like projections 15 to surround the periphery of the tube 6 and to locate at portions near the tips of the divided half portions 7 and 7 other than the flowing opening 11. Peripheral edges 13 of the ring-like projections 15 may be contacted with an inner surface of the hole 3 (See FIG. 7).

In this embodiment, for the purpose of increasing a screw or nail sustaining or holding force with minimum damage of the hole 3 due to the ring-like projection 15 at the time of insertion of the screw or nail sustainer into the hole 3, which is formed with the board 2 such as a plaster board, and also for the purpose of a smooth insertion of the screw or nail sustainer 1 into the hole 3, each of the ring-like projections 15 formed by each of the semi-ring like flanges 16 is designed to reduce its diameter gradually as the ring-like projections 15 become near the tip of the tube 6.

A bag forming wing 17 is formed respectively to project from both sides and a central portion of the outer surface portion near the tips of the divided half portions 7 and 7. The bag forming wings 17 are flexible and one of the wings located at the central portion is formed in the shape of a rectangular and the others located at both sides present in the shape of sector. These bag forming wings 17 are designed to take a suitable shape and size so as to form a bag like portion 19 in such a state that the tips of the wings 17 are squeezed in contact with the inner surface of the hole 3 when the divided half portions 7 and 7 are fit to each other and inserted into the hole (See FIG. 4). Practically, a clearance or gap is formed slightly between the bag forming wings 17, but this does not bring about a problem in achieving the object of the present invention. The bag like portion 19 is opened at the base portion of the tube 6. Next, an example of use of the above-mentioned screw or nail sustainer 1 will be described.

FIGS. 5 through 9 show an example of such a use that a plate 21 having a hook 20 at the lower end thereof is fixed to a board 2 such as a plaster board forming a wall by means of a wood screw 22a (made of metal).

As shown in FIG. 6, first a hole 3 (penetrating hole) is formed by using a gimlet, drill or the like.

Figure 7:
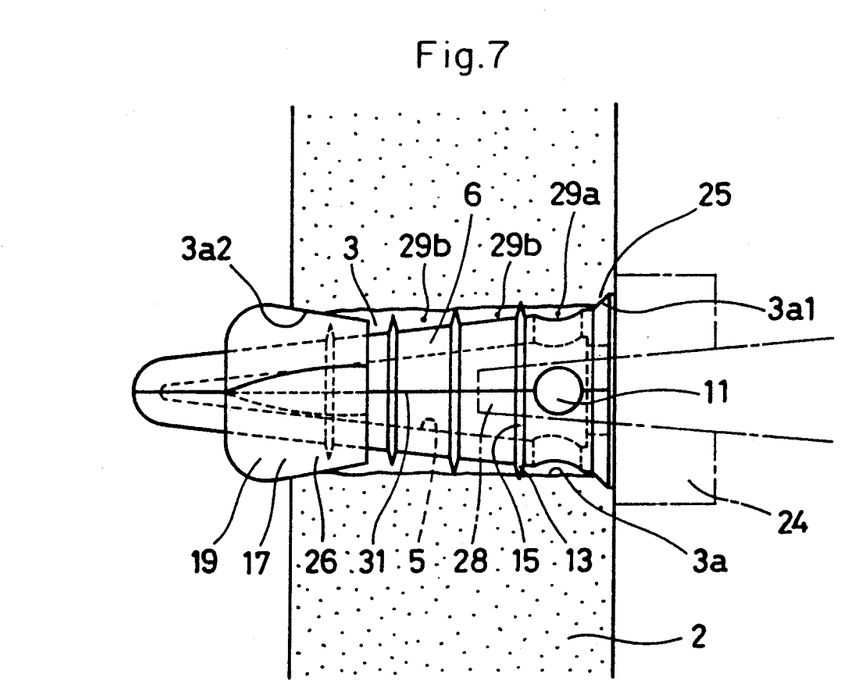
FIG. 7 is a sectional view showing the state of inserting the screw or nail sustainer into the hole of the board.

Thereafter, a pair of divided half portions 7 and 7 are fit to face grooves 23 and 23 toward each other so as to form a screw or nail sustainer 1 and then the screw or nail sustainer 1 is inserted in the hole 3 so as to contact with a base peripheral portion 5 of a tube 6 with an inner base peripheral edge portion 3a1 of the hole 3, as shown in FIG. 7.

In FIG. 7, in view of the length of the screw or nail sustainer which is predetermined and chosen with reference to a thickness of the board 2, tips 26 of the bag forming wings 17 are squeezed and controlled in contact with an inner surface portion 3a2 of the hole 3 so that a bag like portion 19 formed by the bag forming wings 17 may extend to the reverse side of the board 2 and be exposed partly.

In the state of insertion, a space 29a is formed to surround the base peripheral portion of the tube 6 and also ring-like spaces 29b are formed between the ring-like projections 15.

Figure 8:
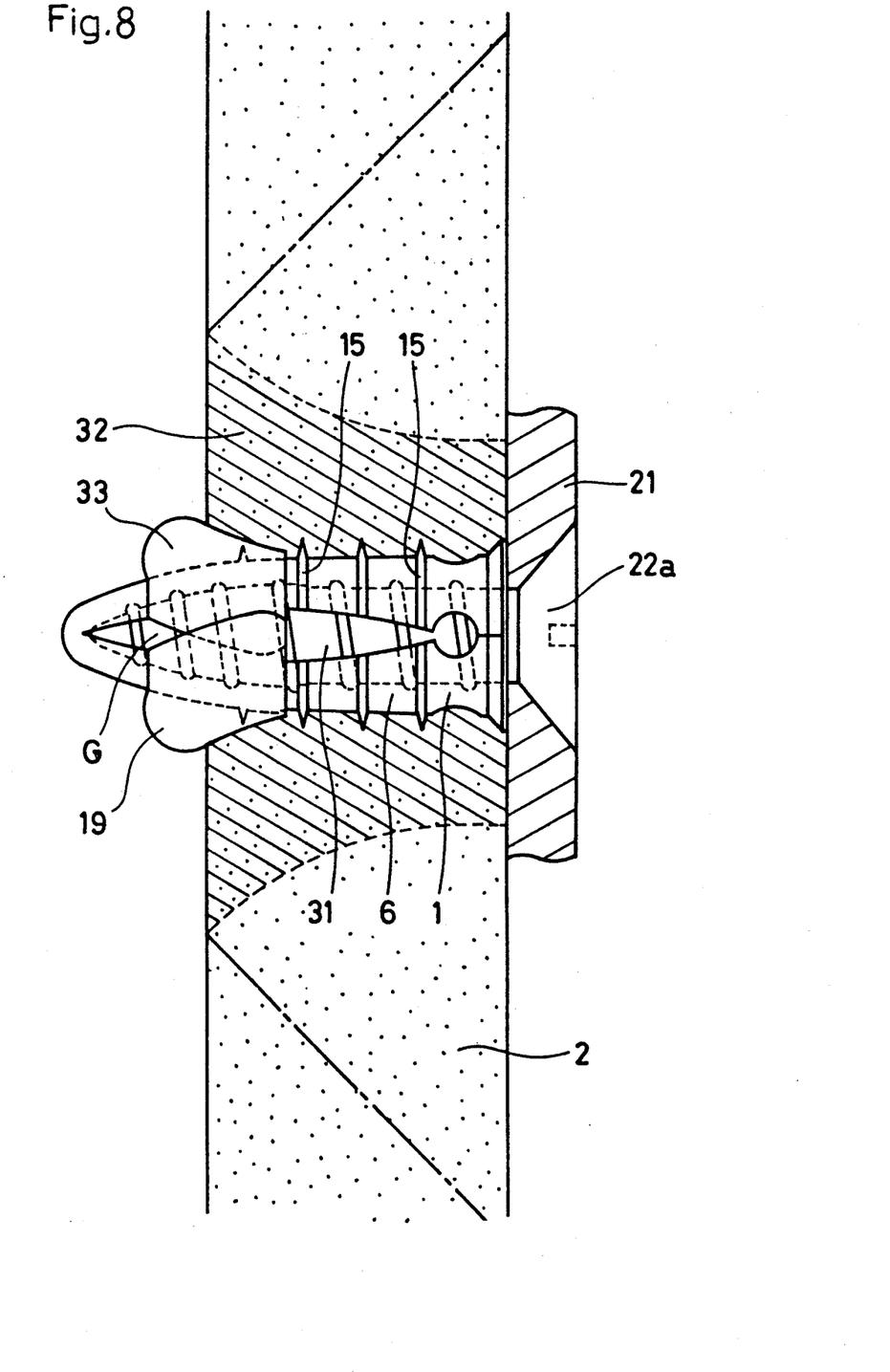
FIG. 8 is a sectional view showing the screw or nail sustainer holding a screw integral with the inner wall of the hole of fine structure.
Figure 9:
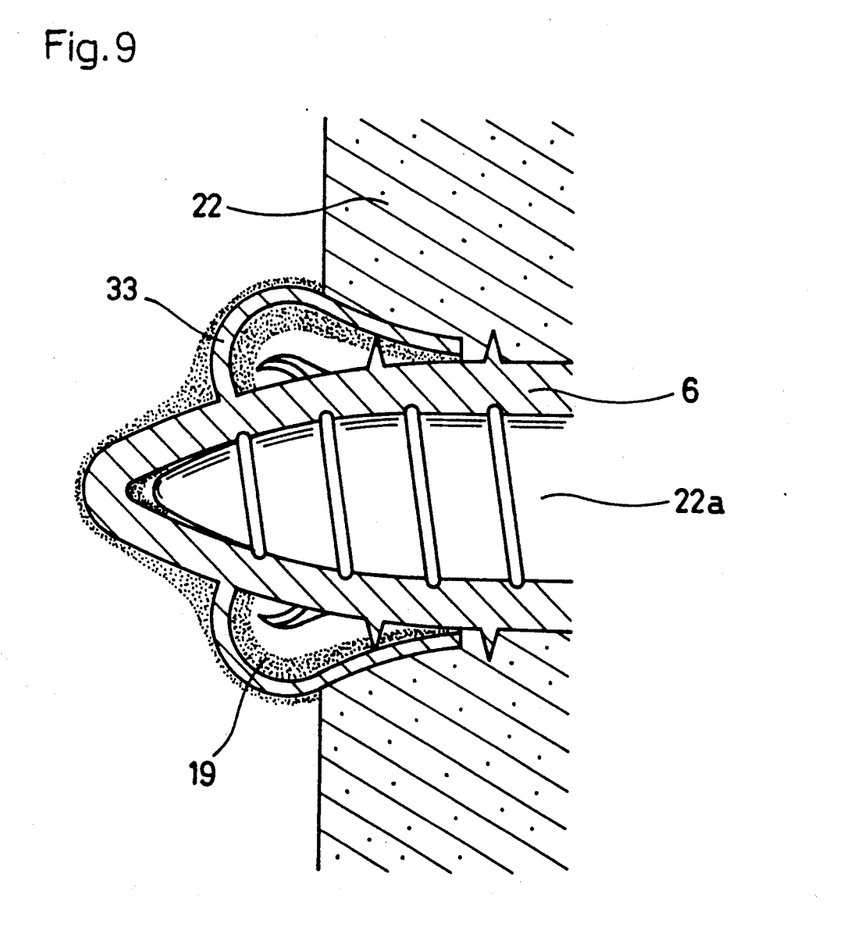
FIG. 9 is a sectional view showing the projection of the bag like portion.

Thereafter, an injection tip 28 of a liquid resin supplier is inserted in a chamber 5 of the screw or nail sustainer, as shown with phantom lines in FIG. 7. Then, an opening of the base portion of the chamber 5 is sealed with a packing 24 having flexibility and a liquid resin is supplied into the chamber 5 of the tube 6. As the result, the supplied liquid resin flows into the ring-like spaces 29a and 29b through the openings 11 and gradually permeates into the inner wall portion of the hole 3. Further, a part of the liquid resin forced into the spaces, flows into the bag like portion 19. After supplying a required amount of the liquid resin, the packing 24 is removed and the wood screw 22a is immediately screwed into the chamber 5 of the tube 6 through an opening of the plate 21, as shown in FIGS. 8 and 9. With the screw operation, contacting portions 31 of the divided half portions 7 and 7 are gradually opened and the liquid resin remaining in the chamber 5 flows into the spaces 29a and 29b through the contacting portions 31 and then permeates into the inner wall portion 32 of the hole 3. A part of the liquid resin forced into the bag like portion 19, flows through clearances G formed with the side of the bag like portion 19, so that the liquid resin adheres to the outer surface of the bag like portion 19. The bag like portion 19 functions to prevent the liquid resin from flowing between the inner wall of the hole and the outer surface of the bag like portion 19 and therefore an inner pressure in the hole 3 may be increased.

As the result, it tends to widen the range of permeation of the liquid resin broad as its permeation becomes near the reverse side of the board 2, as shown with hatching in FIG. 8.

The inner wall portion 32 of the hole of the board 2, as shown with hatching in FIG. 8, becomes a fine structure after hardening of the liquid resin, so that the screw or nail sustainer becomes integral with the fine structure of the board 2. At the same time, the liquid resin is hardened inside and outside the bag like portion 19, so that an expanded area portion 33 may be formed to spread around the tip portion of the hole 3, as shown in FIG. 9. Thus, the screw or nail sustaining or holding force of the screw or nail sustainer 1 may be increased.

Figure 10:
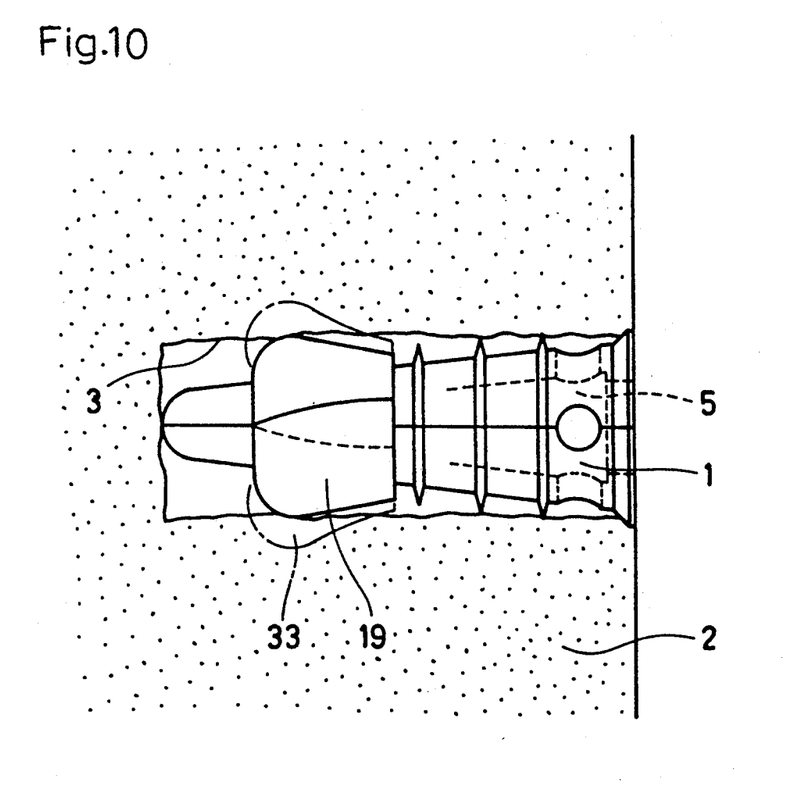
FIG. 10 is a sectional view showing the state of inserting the screw or nail sustainer into a blind hole.

FIG. 10 shows a state in which the screw or nail sustainer 1 is inserted in a blend hole 3 which does not penetrate the board 2. When a screw or nail is inserted into the chamber 5 after injection of the liquid resin, the expanded area portion 33 is formed as shown with phantom lines. Therefore, the nail holding force of the screw or nail sustainer 1 may be increased.

What is claimed is:

1. A screw or nail sustainer comprising a tube having a chamber for inserting a screw or nail into a base opening of the chamber, at least one fluid flow opening formed with a base portion of the tube for forcing a liquid resin to an outer surface of the tube, and at least one ring-like projection formed with a portion of the tube remote from the fluid flow opening toward a tip portion of the tube to project from and to surround a periphery of the tube, said screw or nail sustainer comprising:

a plurality of bag forming wings provided with the tip portion of the tube to project radially, said bag forming wings being constructed to bend toward the base portion of the tube when the screw or nail sustainer is inserted into a hole of a board and to form a bag like portion in cooperation with the outer surface of the tube so as to make an opening toward the base portion of the tube.

2. The screw or nail sustainer of claim 1, wherein the tube comprises a pair of divided half portions which are bendably connected to each other with tips thereof, and that the fluid flow opening is provided in at least one of the divided half portions, and the ring-like projections are formed to be semi-ring like flanges corresponding to the divided half portions, and that the bag forming wings are at least three for each of the divided half portions.

3. The screw or nail sustainer of claim 2, wherein the fluid flow openings are formed by a cutting portion which is formed with a cutting surface of each of the divided half portions.

4. The screw or nail sustainer of claim 1, wherein the bag forming wings are located at an outer surface portion of the tube corresponding to cutting surfaces of divided half portions and also portions of the tube perpendicular to the cutting surfaces.

5. The screw or nail sustainer of claim 1, wherein the tube is divided into the two pieces to form divided half portions along substantially an entire length thereof at substantially a same divisional angle.

* * * * *